US005567894A

United States Patent [19]

Shiomi

[11] Patent Number: 5,567,894

[45] Date of Patent: Oct. 22, 1996

[54] STRINGED MUSICAL INSTRUMENT

[76] Inventor: Shigeki Shiomi, 1-1-14 Kasugade-naka, Konohana-ku, Osaka, Japan

[21] Appl. No.: 501,589

[22] Filed: Jul. 7, 1995

Related U.S. Application Data

[63] Continuation of Ser. No. 218,794, Mar. 28, 1994, abandoned.

[51] Int. Cl.[6] .......... G01D 3/00; G01D 1/08

[52] U.S. Cl. .......... 84/291; 84/267; D17/14

[58] Field of Search .......... 84/291, 292, 267, 84/268, 274, 275, 263, 453; D17/14, 17

[56] References Cited

U.S. PATENT DOCUMENTS

D. 67,190 5/1925 DiMillo .......... 84/268

*Primary Examiner*—Cassandra C. Spyrou

*Attorney, Agent, or Firm*—Jordan and Hamburg

[57] ABSTRACT

A stringed musical instrument such as an acoustic guitar, a mandolin, a ukulele and a violin has a body and a neck protruding away from the body. The body comprises an upper sounding board, a lower sounding board and a side wall. Strings are tensioned between the neck and the body. A concave depression is formed in the body so as to extend from the upper sounding board towards at least one of the opposite sides of the side wall with the neck therebetween to facilitate pressing or stoping the strings positioned on the body.

8 Claims, 6 Drawing Sheets

STRINGED MUSICAL INSTRUMENT

This application is a continuation of application Ser. No. 08/218,794, filed Mar. 28, 1994 now abandoned.

BACKGROUND OF THE INVENTION

This invention relates to a stringed musical instrument and more particularly to a stringed musical instrument such as an acoustic guitar, a mandolin, a ukulele and a violin having an improved configuration of a body or sound box to facilitate playing thereof.

A conventional stringed musical instrument such as an acoustic guitar which has a body including an upper sounding board, a lower sounding board and a side wall, a neck projecting from the body, and strings tensioned between the neck and the body.

To play the guitar of this arrangement, the strings tensioned between the neck and the body are forcibly vibrated and the vibrations are transmitted to the body. The body is then resonated and the sound is amplified within the body to generate sounds of proper volume.

When a performer plays the guitar of the above arrangement, it is frequently necessary for the performer to use his or her fingers to press or stop the strings at particular regions positioned on the body. However, the side wall of the body in proximity to a base portion of the neck acts as an obstruction to prevent the player from smoothly pressing or stopping such strings. That is, it is necessary to excessively distort or twist his or her wrist and fingers to press or stop the strings, which may be painful.

To solve the above drawback, a curvature 21 which is generally defined in a conventional electric guitar, as illustrated in FIG. 5, where the curvature 21 is defined in a body 23 adjacent to the neck 22, having strings 29 may be employed in the acoustic guitar of this type. However, it is likely to lower a sound effect, since a resonant hollow, which is defined by the body of the acoustic guitar, is undesirably influenced by the changing of the configuration of the body.

SUMMARY OF THE INVENTION

It is an object of the present invention to provide a stringed musical instrument, such as an acoustic guitar, which facilitates pressing or stopping strings tensioned on the body without decreasing a sound effect.

Accordingly, there is provided a stringed musical instrument which comprises a body, the body including an upper sounding board, a lower sounding board and a side wall which defines a resonant cavity, a neck protruding away from the body, the body extending at substantially right angles from both sides of the neck, strings tensioned between the body and the neck, and a concave depression formed in the body so as to extend from the upper sounding board towards at least one of the opposite sides of the side wall with a base portion of the neck therebetween.

With the above arrangement, when a performer presses his or her fingers against the strings at particular regions which are positioned on the body, the side wall does not act as an obstacle the pressing of the strings. That is, the performer can extend his or her hand over the body in the shortest distance towards the strings on the body so as to readily reach these strings. Thus, it is not necessary that the performer exessively distort or twist his or her wrist and fingers. The performer can press or stop such tone parts of the strings without twisting his or her fingers into a painful position. In addition, since the concave depression is preferably located in a marginal region of the body, the body can substantially maintain its conventional configuration suitable for the sound effect.

The above, and other objects, features and advantages of the present invention will become apparent from the detailed description read in conjunction with the accompanying drawings, which are given by way of illustration only, and thus are not limitative of the present invention.

DETAILED DESCRIPTION OF THE PREFERRED EMBODIMENTS

Figure 1:
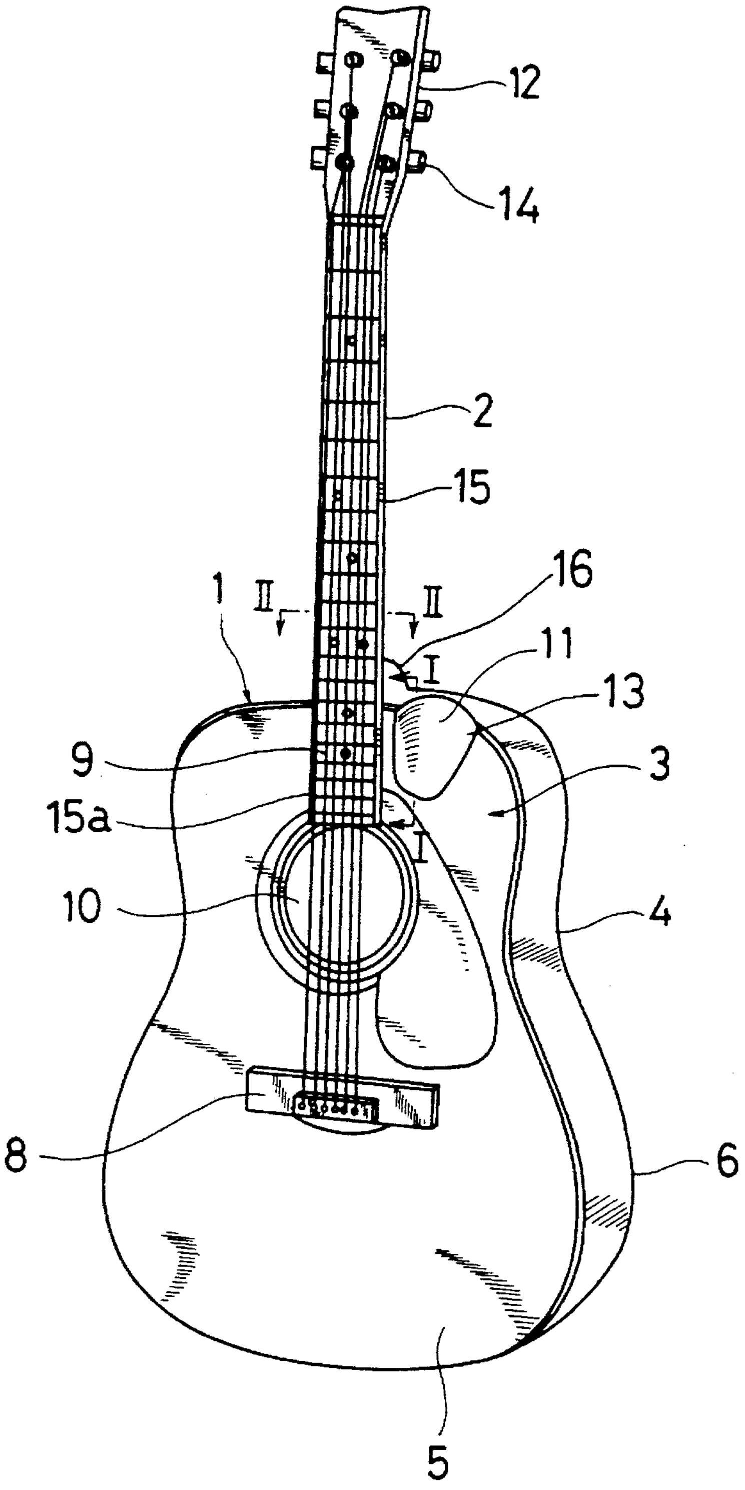
FIG. 1 is a perspective view illustrating one embodiment of a guitar of the present invention.
Figure 2A:
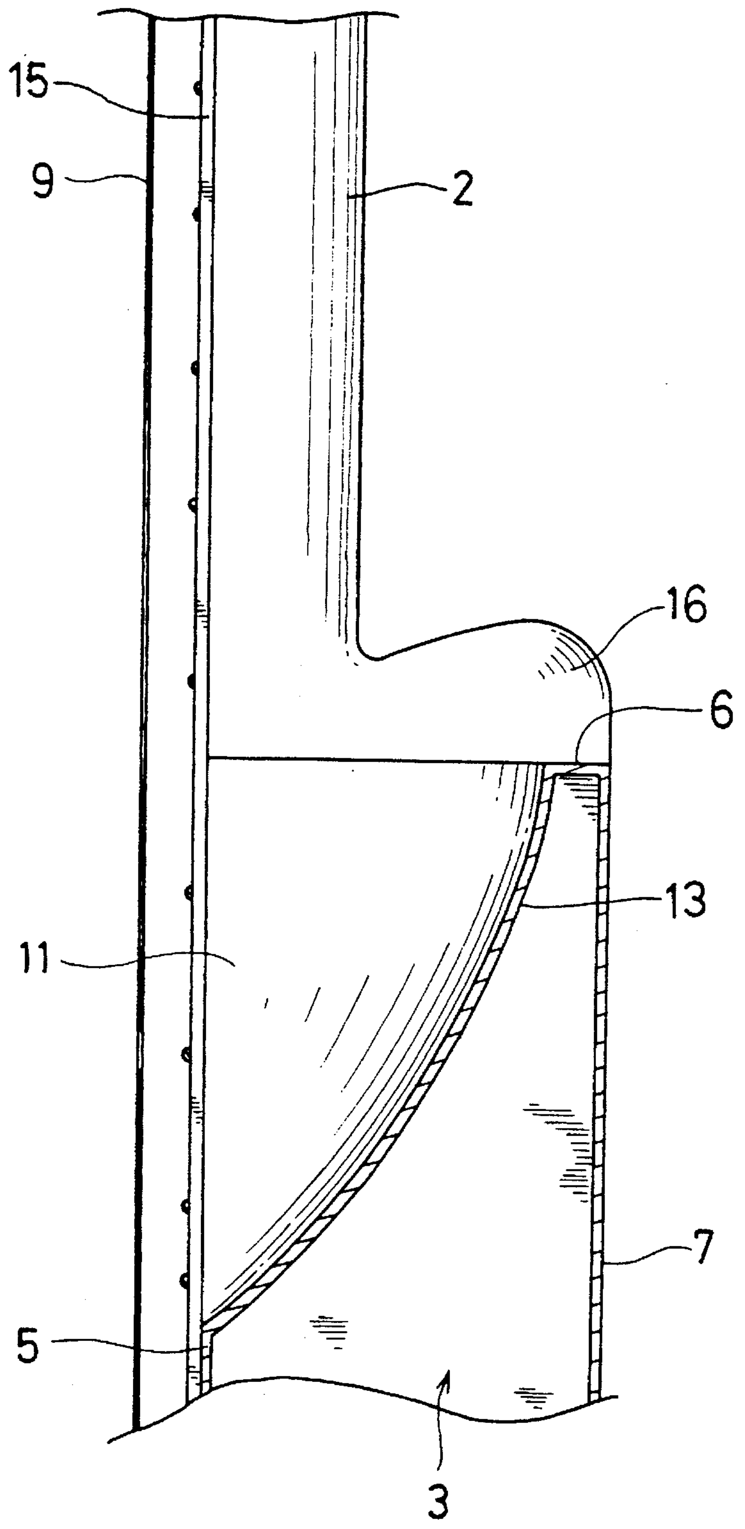
FIG. 2A is a partial cross sectional view taken along a line I—I of FIG. 1.

Referring to FIGS. 1 and 2, a guitar 1 as an example of a stringed musical instrument, includes a body 3 and a neck 2 protruding away from the body 3. The body 3 comprises an upper sounding board 5, a lower sounding board 7 and a side wall 6, in which a resonant cavity is established. A heel 16 is disposed between the side wall 6 and a base portion of the neck 2 so as to rigidly support the neck 2. On opposite sides of the body are formed waists 4. A head portion 12 is disposed on an outer end of the neck 2, on which turning members 14 are arranged. A finger board 15 is secured on the neck 2 and extends inwardly over the upper sounding board 5. A bridge base 8 is secured to the upper sounding board 5. The strings 9 are tensioned between the turning members 14 and the bridge base 8. A sound hole 10 is located in the upper sounding board 5 so as to function as an outlet port for a sound amplified within the body 3. A concave depression 11 extends from an inner region of the upper sounding board 5 towards the right hand side of the side wall 6 adjacent to the neck 2. The concave depression 11 has a U-shape in plan and side views. That is, the concave depression 11 which starts at the inner region of the upper sounding board 5 gradually increases in depth and width as it advances towards the side wall 6, consequently defining a U-shaped cut-away in the side wall 6.

Figure 2B:
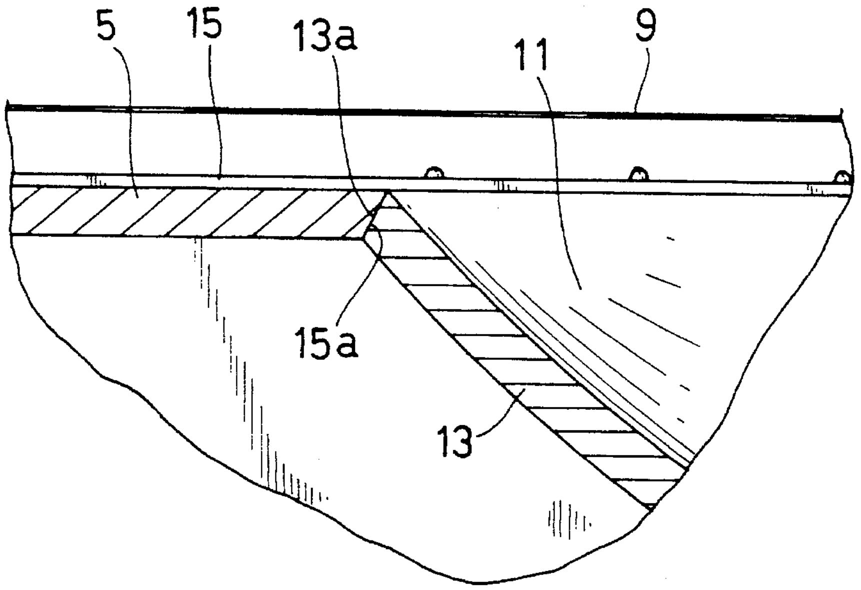
FIGS. 2B and 2C are partially enlarged sectional views of FIG. 2A.
Figure 2C:
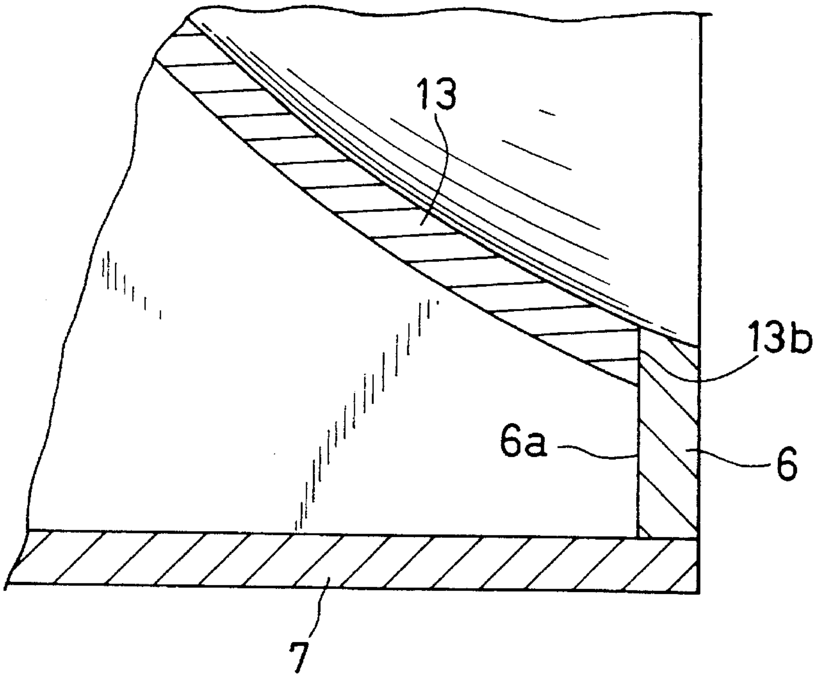
Figure 3:
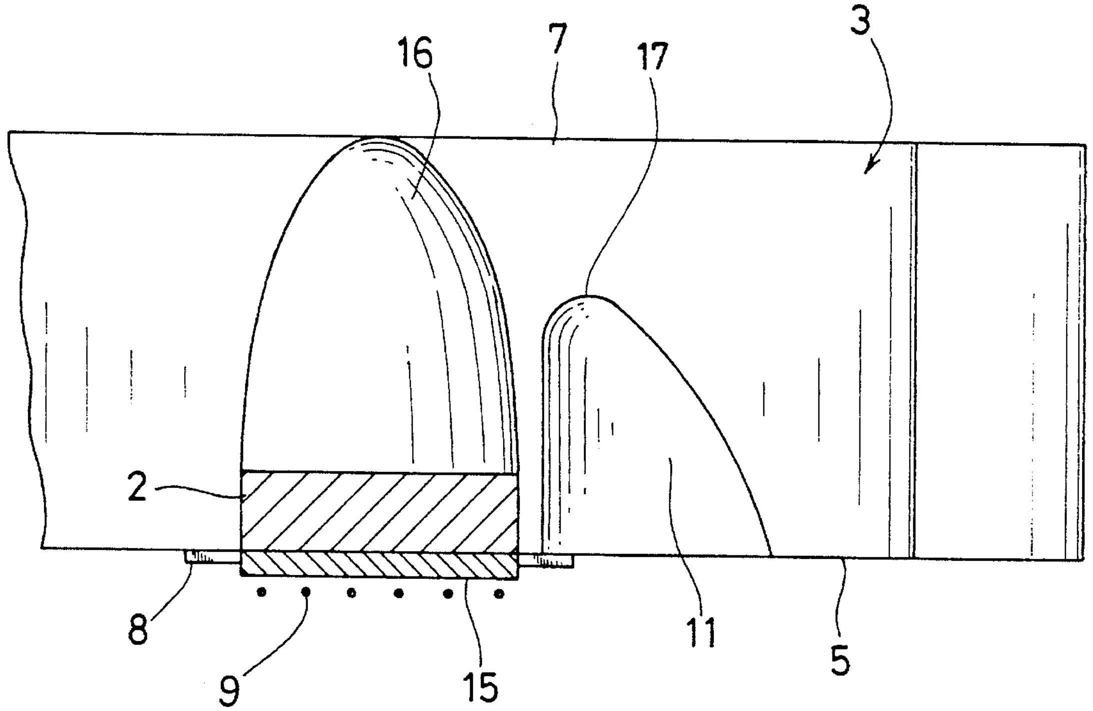
FIG. 3 is a partial cross sectional view taken along a line II—II of FIG. 1.

Referring to FIGS. 2B and 2C, an upper side edge 13*a* of a concave wall 13 abuts against a side edge 15*a* of the upper sounding board 5, and a lower side edge 13*b* of the concave wall 13 abuts against an inner surface 6*a* of the side wall 6. Whereby, it is unlikely that the structural strength of the guitar 1 is undesirably weakened by the compression pressure which is exerted by the tensioned strings 9 and is applied onto the guitar 1 in the axial direction thereof. In addition, the concave depression 11 has an arctuated cross section as best shown in FIG. 3. Therefore, the structural strength of the guitar 1 against the compression pressure which is applied on the concave portion 11 in the longitudinal direction thereof is further increased.

To further facilitate the playing of the resonant or high-pitched tone part of each of the strings 9, the concave depression 11 is formed so as to extend along the inwardly extending portion 15*a* of the finger board 15 as close as possible, and has a concave base region 17 which also extends along the neck 2 as close as possible, as illustrated in FIG. 3. The depth of the concave depression 11 is determined in consideration of the structural strength of the body 3 and the preferable contour which enables the performer to place his or her hand thereon in good condition. Consequently, it has been found that when the concave depression 11 in the side wall 6 has a depth which is more than half and less than two thirds of the overall depth of the side wall 6, the most preferable result can be obtained.

When the guitar of the above arrangement is to be played, the waist 4 of the body 3 is positioned on the performer's lap, and the body 3 is held with the right arm, and the tensioned forces of the strings 9 are adjusted by the actuation of the turning member 14 on the head body 12 for the tuning of the strings 9. Then, the performer plays the guitar 1 by pressing or stopping the strings 9 at their predetermined positions with the fingers of the left hand and by plucking or twanging the strings 9 with fingers of the right hand or with a plectrum held by the right hand. When the performer needs to press or stop the treble or high pitched tone part of each of the strings 9, which is positioned on the inwardly extended portion 15*a* of the finger board 15, the performer positions the back of the his or her left hand on the concave depression 11. In this state, the side wall 6 does not obstruct motions of the left hand. Thus, the performer can readily stop the treble or high pitched tone part of each of the strings 9. In addition, since the concave depression 11 is not formed in the lower sounding board 7, the guitar can substantially maintain its configuration suitable for generating a proper sound effect.

Figure 4:
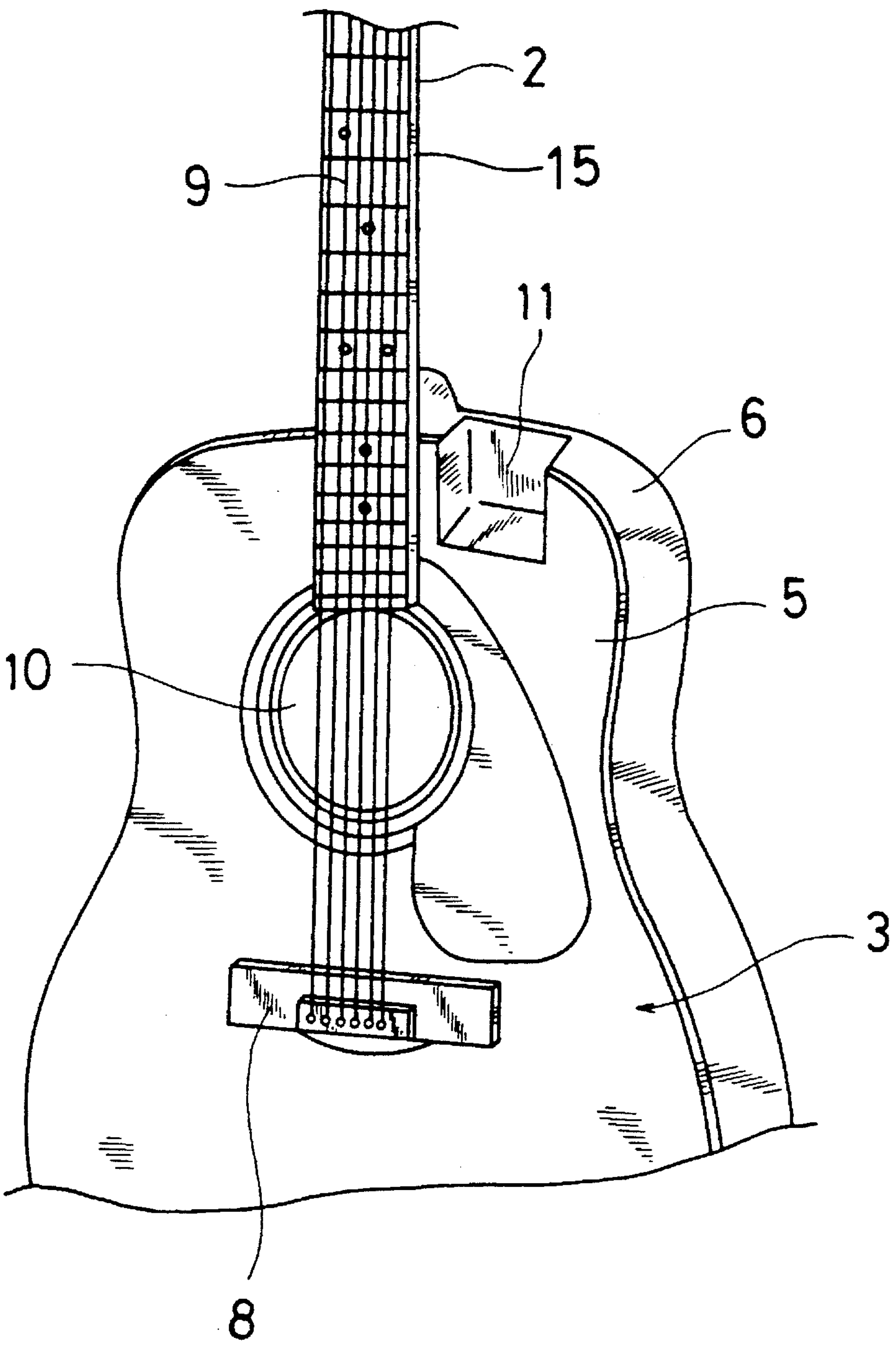
FIG. 4 is a perspective view illustrating another embodiment of the guitar of the present invention.
Figure 5:
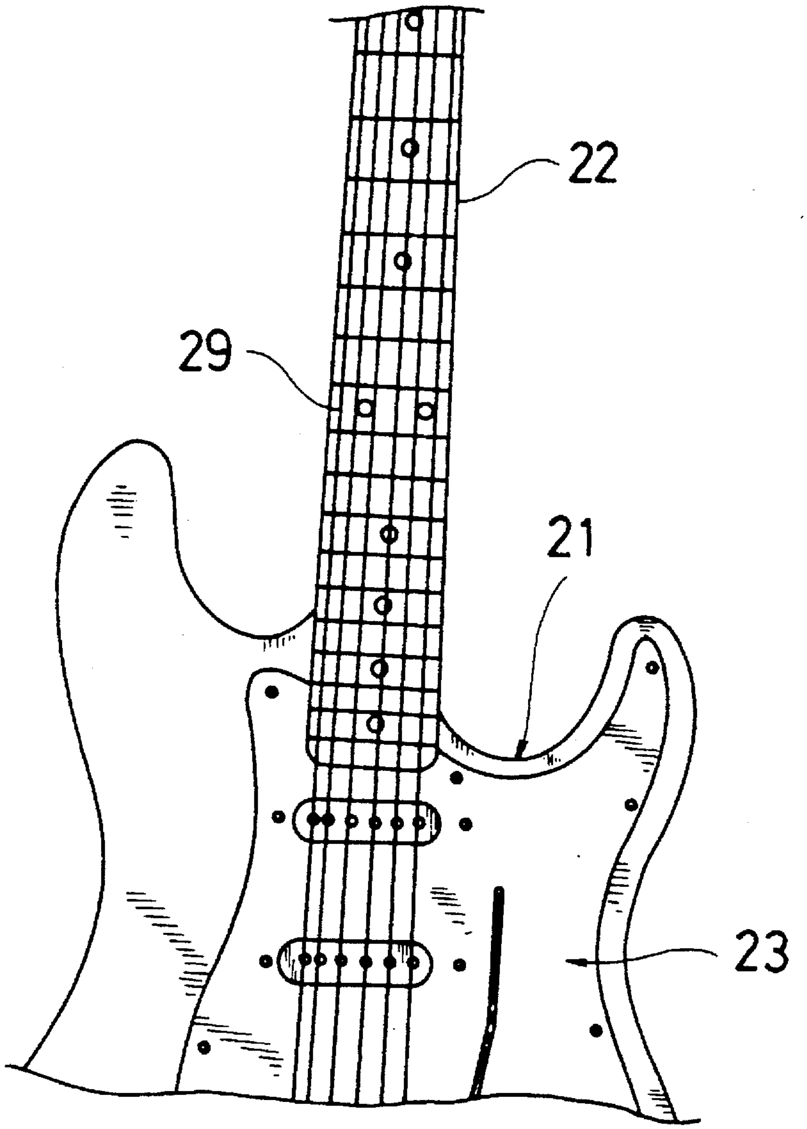
FIG. 5 PRIOR ART
FIG. 5 is a front view illustrating a conventional guitar.

The concave depression 11 may be varied in shape provided that it can facilitate the playing of the strings 9 which are positioned on the body 3, as illustrated in FIG. 4, in which the concave depression 11 has a rectangular shape.

In the above embodiments, the concave depression 11 extends from the inner region of the upper sounding board 5 towards the right hand side of the side wall 6. However, it is a matter of course that the concaved depression 11 may extends towards the left hand side of the side wall 6, and it may extends towards both sides of the side wall 6 depending on a playing position of the performer. It is essential that the concave depression is formed on the body of the guitar so as to facilitate the pressing or stopping of the strings which are positioned on the body.

In the above embodiments, the concave portion is employed in the acoustic guitar. However, the concave depression may be used in the other stringed musical instruments such as mandolins, ukuleles and violins.

This specification is by no means intended to restrict the present invention to the preferred embodiments set forth therein. Various modifications to the inventive stringed musical instrument, as described herein, may be made by those skilled in the art without departing from the spirit and scope of the present invention.

What is claimed is:

1. A stringed musical instrument comprising a body, the body comprising an upper sounding board, a lower sounding board and a side wall for defining a resonant cavity, a neck protruding away from the body, a plurality of strings tensioned between the body and the neck, the body having shoulders extending at substantially right angles from both sides of the neck at the point where the body intersects the neck, the body having a concave depression in a portion of the upper sounding board of the body extending at a substantially right angle from the neck, the concave depression gradually increasing in depth and width as it advances from the upper sounding board towards the side wall, and a portion of the concave depression having a depth more than half and less than two thirds of an entire depth of the side wall.

2. The stringed musical instrument according to claim 1, wherein the concave depression has a rectangular shape.

3. The stringed musical instrument according to claim 1, wherein an edge of the concave depression closest to the neck extends in a direction substantially parallel to the neck.

4. A stringed musical instrument according to claim 1, wherein the concave depression has a concave wall, an upper side edge of the concave wall abuts against a side edge of the upper sounding board and a lower side edge of the concave wall abuts against an inner surface of the side wall.

5. A stringed musical instrument comprising a body, the body comprising an upper sounding board, a lower sounding board and a side wall for defining a resonant cavity, a neck protruding away from the body, a plurality of strings tensioned between the body and the neck, the body extending at substantially right angles from both sides of the neck, the body having a concave depression in a portion of the body extending at a substantially right angle from the neck and a portion of the concave depression having a depth more than half and less than two thirds of an entire depth of the side wall.

6. The stringed musical instrument according to claim 5, wherein the concave depression has a rectangular shape.

7. A stringed musical instrument according to claim 5, wherein the concave depression has a concave wall, an upper side edge of the concave wall abuts against a side edge of the upper sounding board and a lower side edge of the concave wall abuts against an inner surface of the side wall.

8. A stringed musical instrument comprising a body, the body comprising an upper sounding board, a lower sounding board and a side wall for defining a resonant cavity, a neck protruding away from the body, a plurality of strings tensioned between the body and the neck, the body extending at substantially right angles from both sides of the neck, the body having a concave depression in a portion of the body extending at a substantially right angle from the neck, and a portion of the concave depression having a depth more than half of an entire depth of the side wall.

* * * * *